United States Patent
Aneja et al.

(10) Patent No.: US 6,750,918 B2
(45) Date of Patent: Jun. 15, 2004

(54) METHOD AND SYSTEM FOR USING SINGLE OSD PIXMAP ACROSS MULTIPLE VIDEO RASTER SIZES BY USING MULTIPLE HEADERS

(75) Inventors: Charu Aneja, Indianapolis, IN (US); Aaron Hal Dinwiddie, Fishers, IN (US); Patrick Joseph Wiegand, Indianapolis, IN (US); Charles William Worrell, Carmel, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 383 days.

(21) Appl. No.: 09/845,955

(22) Filed: Apr. 30, 2001

(65) Prior Publication Data

US 2002/0051084 A1 May 2, 2002

Related U.S. Application Data (60) Provisional application No. 60/204,058, filed on May 12, 2000.

(51) Int. Cl.[7] .................................................. H04N 5/50
(52) U.S. Cl. .................... 348/569; 348/554; 348/556; 348/589
(58) Field of Search .............................. 348/554, 564, 348/778, 588, 569, 567, 589, 600, 469, 461, 467, 465, 468; 345/698, 546, 547, 566, 3.3, 545; H04N 5/50, 5/46, 3/27

(56) References Cited

U.S. PATENT DOCUMENTS

| | | | |
|---|---|---|---|
| 4,477,830 A | 10/1984 | Lindman et al. | 358/1 |
| 4,792,936 A | 12/1988 | Picard | 369/59 |
| 5,020,003 A | 5/1991 | Moshenberg | 364/518 |
| 5,420,605 A | 5/1995 | Vouri et al. | 345/132 |
| 5,489,947 A | 2/1996 | Cooper | 348/589 |
| 5,534,942 A | 7/1996 | Beyers, Jr. et al. | 348/569 |
| 5,640,502 A | 6/1997 | Knox et al. | 395/507 |
| 5,745,095 A | 4/1998 | Parchem et al. | 345/114 |
| 6,002,835 A | 12/1999 | Watanabe | 386/95 |
| 6,144,414 A * | 11/2000 | Toba | 348/564 |
| 6,175,388 B1 * | 1/2001 | Knox et al. | 348/569 |
| 6,462,746 B1 * | 10/2002 | Min et al. | 345/545 |
| 6,480,238 B1 * | 11/2002 | Knox et al. | 348/569 |

FOREIGN PATENT DOCUMENTS

| | | | |
|---|---|---|---|
| EP | 1069770 | 1/2001 | H04N/5/45 |
| WO | WO9535626 | 12/1995 | H04N/5/45 |
| WO | WO9817058 | 4/1998 | H04N/5/45 |

OTHER PUBLICATIONS

EPO Search Report—Jan. 8, 2004.

* cited by examiner

Primary Examiner—Michael H. Lee
Assistant Examiner—Trang U. Tran
(74) Attorney, Agent, or Firm—Joseph S. Tripoli; Ronald H. Kurdyla; Vincent E. Duffy (57) ABSTRACT

Described is a TV system that uses a single pixmap across multiple video rasters having different raster sizes. In general, the TV system uses at least two headers to select different portions of a single pixmap to be displayed based on different raster sizes. Specifically, each of the two headers points to a single pixmap. In the TV system, the size of the central portion is fixed while the size of the sidepanel portion can be adjusted depending on the displaying mode. In response to different displaying modes, the TV system selectively invokes one of the two headers to select a respective portion to be displayed in the pixmap. By doing so, a single pixmap can be used across multiple video rasters having different raster sizes.

16 Claims, 8 Drawing Sheets

METHOD AND SYSTEM FOR USING SINGLE OSD PIXMAP ACROSS MULTIPLE VIDEO RASTER SIZES BY USING MULTIPLE HEADERS

RELATED APPLICATIONS

This is a Non-Provisional Application of Provisional Application Serial No. 60/204,058 by Aneja et al, filed May 12, 2000.

FIELD OF THE INVENTION

The present invention generally relates to video data processing, and more specifically to video data processing for displaying a bitmap over video images.

BACKGROUND OF THE INVENTION

Home entertainment systems, which combine Personal Computer and television functions (PC/TV systems), are increasingly becoming generic user-interactive multiple-source and multiple-destination communication devices. Such multimedia systems are required to communicate in different data formats between multiple locations for a variety of applications in response to user requests. For example, a PC/TV system may receive data from satellite or terrestrial sources comprising High Definition Television (HDTV) broadcasts, Multi-point Microwave Distribution System (MMDS) broadcasts and Digital Video Broadcasts (DVB). A PC/TV system may also receive and transmit data via telephone (e.g., the Internet) and coaxial lines (e.g., cable TV) as well as from both remote and local sources such as Digital Video Disk (DVD), CDROM, VHS and Digital VHS (DVHS™) type players, and PCs.

Such a generic PC/TV entertainment system requires a variety of different On Screen Displays (OSDs) for use with video program content from different sources or for different applications. In such systems, the OSD function is used to display bitmap images which overlay the video image on a TV display, for the purpose of conveying information or displaying menus on the TV display. The OSD is rendered on a "pixmap" in memory, which is mapped to the TV display. This OSD pixmap needs to be the same size as the active video region on the TV display at any location over the video image.

In some systems, the video raster switches between 2H and 2.14H scanning rate modes based on the channel being watched. The size of the active video region is therefore different in each of the two modes. This requires that a different sized OSD pixmap must be available for each raster mode. For example, in the 2H mode the OSD size requirement is 480 lines×2096 pixels/line and in the 2.14 mode the OSD size requirement is 540 lines×1920 pixels/line. This is because the OSD pixel clock is a function of the video raster clock.

One approach to solving this problem is to keep multiple pixmaps for multiple video images having different raster sizes and to switch to a particular pixmap based on a desired displaying mode. However, one shortcoming of such an approach is that there is a waste of memory space because the approach involves rendering all OSD bitmaps multiple times (once for each pixmap). Another shortcoming of such an approach is that it slows down the system because the pixmap rendering time will be multiplied.

There is, therefore, a need for an improved method and system that use a single pixmap across multiple video rasters having different sizes. The present invention provides a method and system to meet this need.

SUMMARY OF THE INVENTION

The present invention provides a method and system that use a single pixmap across multiple video rasters having different raster sizes. In general, the present invention uses at least two headers (e.g., a first header and a second header) to select different portions of a single pixmap to be displayed based on different raster sizes. Each of the two headers points to a single pixmap. In response to different displaying modes, the present invention selectively invokes the first or second header to select a respective portion to be displayed in the pixmap. By doing so, a single pixmap can be used across multiple video rasters having different raster sizes.

DETAILED DESCRIPTION OF THE PREFERRED EMBODIMENT

The characteristics and advantages of the present invention will become more apparent from the following description, given by way of example.

Figure 1:
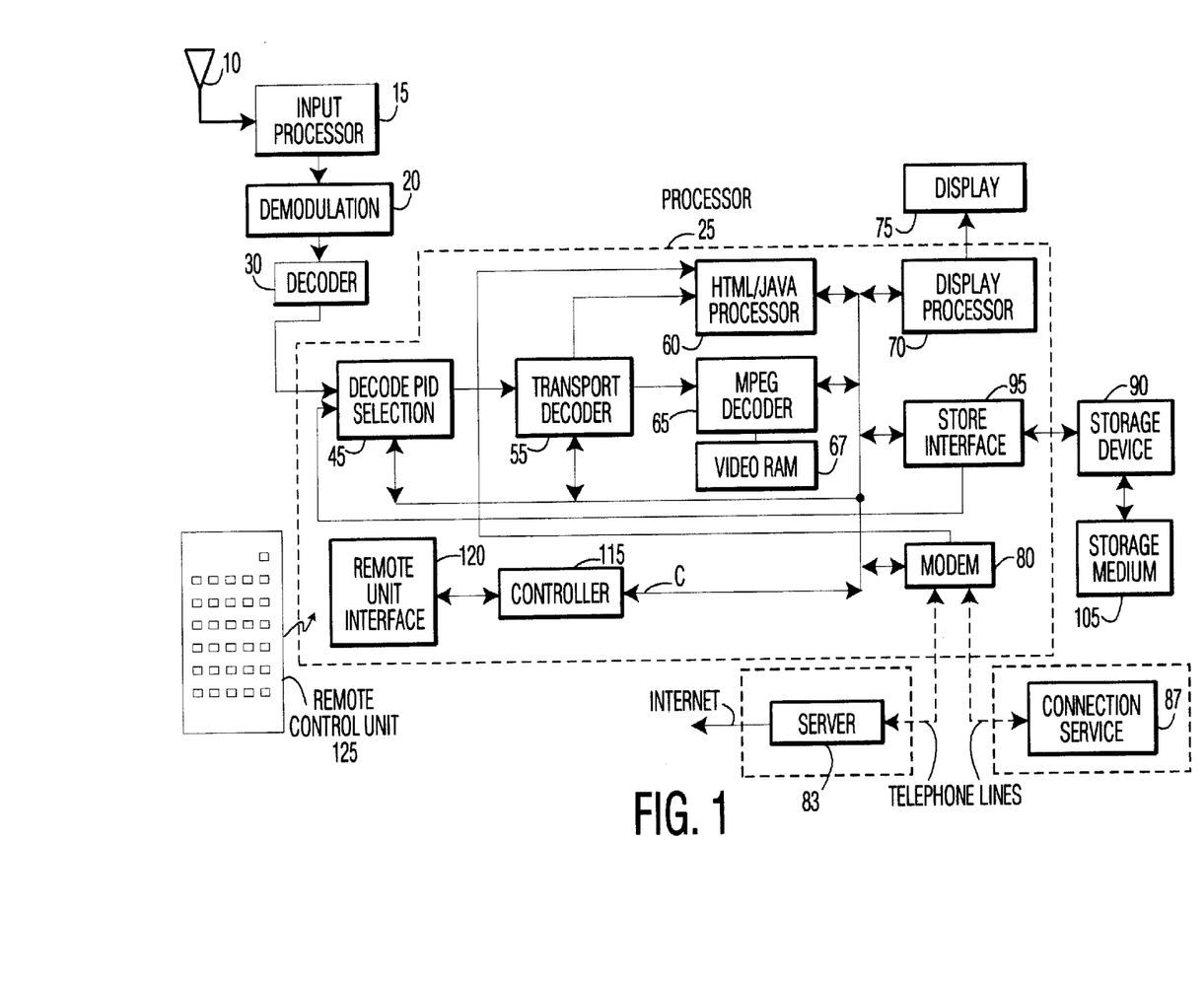
FIG. 1 shows an exemplary home entertainment system for processing OSD header and content data according to the present invention.

Referring now to FIG. 1, a block diagram of an exemplary digital video receiving system that operates according to the principles of the invention is shown. The video receiver system includes an antenna 10 and input processor 15 for receiving and digitizing a broadcast carrier modulated with signals carrying audio, video, and associated data, a demodulator 20 for receiving and demodulating the digital output signal from input processor 15, and a decoder 30 outputting a signal that is trellis decoded, mapped into byte length data segments, de-interleaved, and Reed-Solomon error corrected. The corrected output data from decoder unit 30 is in the form of an MPEG compatible transport data stream containing program representative multiplexed audio, video, and data components.

The video receiver system further includes a modem 80 that may be connected, via telephone lines, to a server 83 or connection service 87 such that data in various formats (e.g., MPEG, HTML, and/or JAVA) can be received by the video receiver system over the telephone lines.

A processor 25 processes the data output from decoder 30 and/or modem 80 such that the processed data can be displayed on a display unit 75 or stored on a storage medium 105 in accordance with requests input by a user via a remote control unit 125. More specifically, processor 25 includes a controller 115 that interprets requests received from remote control unit 125 via remote unit interface 120 and appropriately configures the elements of processor 25 to carry out user requests (e.g., channel, website, and/or OSD display). In one exemplary mode, controller 115 configures the elements of processor 25 to provide MPEG decoded data and an OSD for display on display unit 75. In another exemplary mode, controller 15 configures the elements of processor 25 to provide an MPEG compatible data stream for storage on storage medium 105 via storage device 90 and store interface 95. In a further exemplary mode, controller 115 configures the elements of processor 25 for other communication modes, such as for receiving bidirectional (e.g. Internet) communications via server 83 or connection service 87.

Processor 25 includes a decode PID selection unit 45 that identifies and routes selected packets in the transport stream from decoder 30 to transport decoder 55. The transport stream from decoder 30 is demultiplexed into audio, video, and data components by transport decoder 55 and is further processed by the other elements of processor 25, as described in further detail below.

The transport stream provided to processor 25 comprises data packets containing program channel data, ancillary system timing information, and program specific information such as program content rating and program guide information. Transport decoder 55 directs the ancillary information packets to controller 115 which parses, collates, and assembles the ancillary information into hierarchically arranged tables. Individual data packets comprising the user selected program channel are identified and assembled using the assembled program specific information. The system timing information contains a time reference indicator and associated correction data (e.g. a daylight savings time indicator and offset information adjusting for time drift, leap years, etc.). This timing information is sufficient for a decoder to convert the time reference indicator to a time clock (e.g., United States east coast time and date) for establishing a time of day and date of the future transmission of a program by the broadcaster of the program. The time clock is useable for initiating scheduled program processing functions such as program play, program recording, and program playback. Further, the program specific information contains conditional access, network information, and identification and linking data enabling the system of FIG. 1 to tune to a desired channel and assemble data packets to form complete programs. The program specific information also contains ancillary program content rating information (e.g., an age based suitability rating), program guide information (e.g., an Electronic Program Guide—EPG) and descriptive text related to the broadcast programs as well as data supporting the identification and assembly of this ancillary information.

Transport decoder 55 provides MPEG compatible video, audio, and sub-picture streams to MPEG decoder 65. The video and audio streams contain compressed video and audio data representing the selected channel program content. The sub-picture data contains information associated with the channel program content such as rating information, program description information, and the like.

MPEG decoder 65 cooperates with a random access memory (RAM) 67 to decode and decompress the MPEG compatible packetized audio and video data from unit 55 and provides decompressed program representative pixel data to display processor 70. Decoder 65 also assembles, collates and interprets the sub-picture data from unit 55 to produce formatted program guide data for output to an internal OSD module (See FIGS. 2, 3, and 7). The OSD module cooperates with RAM 67 to process the sub-picture data and other information to generate pixel mapped data representing subtitling, control, and information menu displays including selectable menu options and other items for presentation on display device 75 in accordance with the present invention. The control and information menus that are displayed enable a user to select a program to view and to schedule future program processing functions including tuning to receive a selected program for viewing, recording of a program onto storage medium 105, and playback of a program from medium 105.

The control and information displays, including text and graphics produced by the OSD module, are generated in the form of overlay pixel map data under direction of controller 115. The overlay pixel map data from the OSD module is combined and synchronized with the decompressed pixel representative data from MPEG decoder 65 under direction of controller 115. Combined pixel map data representing a video program on the selected channel together with associated sub-picture data is encoded by display processor 70 and output to device 75 for display.

The principles of the invention may be applied to terrestrial, cable, satellite, Internet or computer network broadcast systems in which the coding type or modulation format may be varied. Such systems may include, for example, non-MPEG compatible systems, involving other types of encoded data streams and other methods of conveying program specific information. Further, although the disclosed system is described as processing broadcast programs, this is exemplary only. The term 'program' is used to represent any form of packetized data such as audio data, telephone messages, computer programs, Internet data or other communications, for example.

The architecture of FIG. 1 is not exclusive. Other architectures may be derived in accordance with the principles of the invention to accomplish the same objectives. Further, the functions of the elements of processor 25 of FIG. 1 may be implemented in whole or in part within the programmed instructions of a microprocessor. In addition, the principles of the invention apply to any form of MPEG or non-MPEG compatible electronic program guide.

Figure 2:
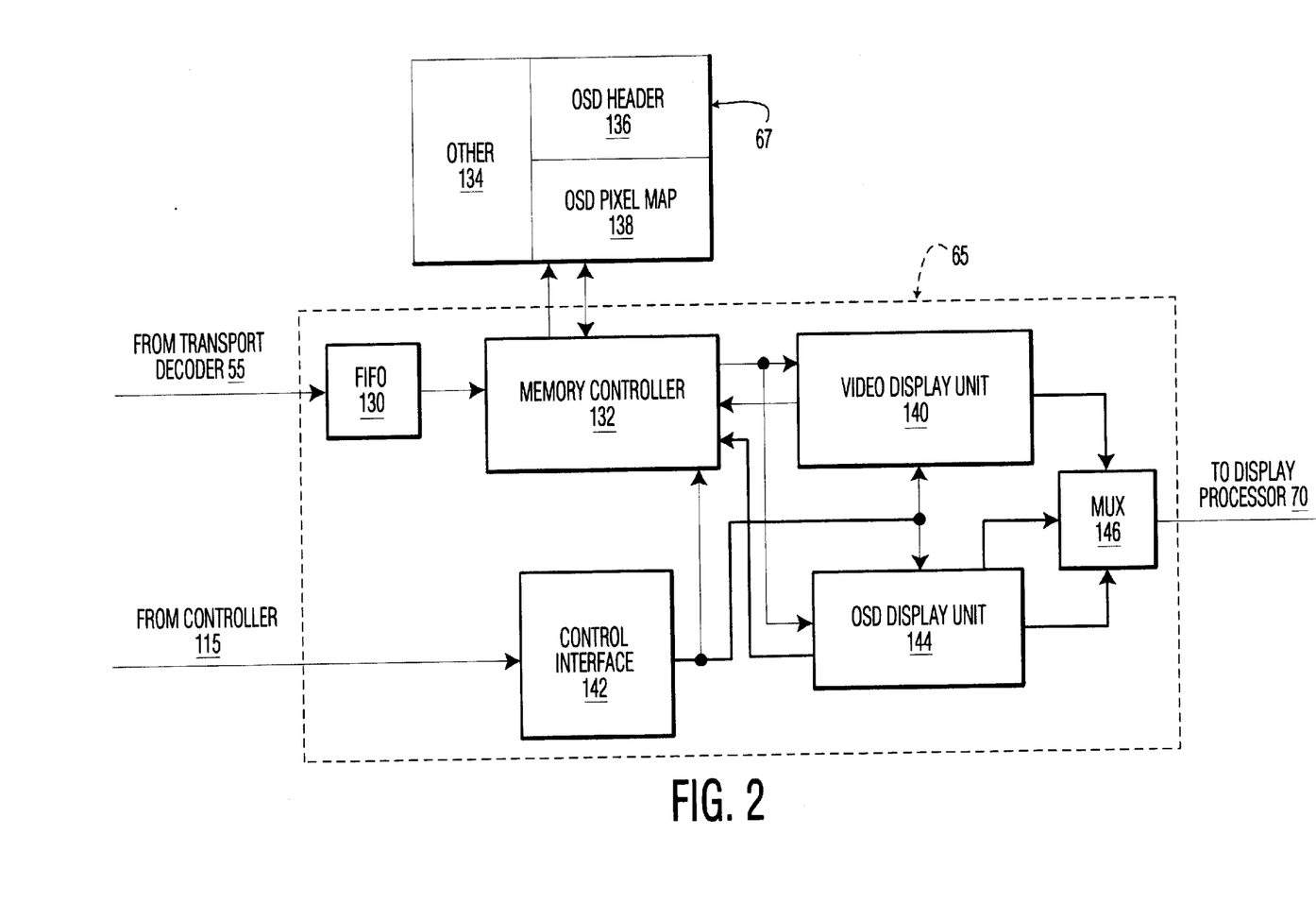
FIG. 2 further illustrates the MPEG decoder and video memory of the exemplary home entertainment decoder system shown in FIG. 1.

Referring now to FIG. 2, MPEG decoder 65 and video RAM 67 are illustrated in further detail. Decoder 65 includes a FIFO buffer memory 130 which receives video data packets on demand in small segments from transport decoder 55 and couples them into relatively larger segments via a memory controller 132 to a section 134 of RAM 67 reserved for decoding and decompression. Video RAM 67 is addressed under the control of memory controller 132. Section 134 of RAM 67 includes a rate buffer section for storing the received video data packets and a frame store section for storing frames of video information during the decoding and decompression operation. A video display unit 140 decodes and decompresses the stored video data packets to form a sequence of video image components. For this purpose, video display unit 140 requests data from the decoding and decompression portion of section 134 via memory controller 132 as required. The sequence of video image components are synchronized with field, line, and pixel rate signals generated by display processor 70. Control data generated by controller 115 is received by controller interface unit 142 and coupled to various elements of MPEG decoder 65 via an internal control bus.

The OSD portion of MPEG decoder 65 includes an OSD display unit 144 which communicates with an OSD header memory block 136 and an OSD pixel map or bitmap memory block 138 of RAM 67 via memory controller 132, as discussed in further detail below. Upon initialization of the video receiver, controller 115 generates a single pixel map and associated pixel map headers and stores them in OSD pixel map and OSD header blocks of memory 138 and 136 via control interface 142 and memory controller 132.

An output multiplexer 146, under the control of OSD display unit 144, combines the output of video display unit 140 (video image components) and the output of OSD display unit 144 (graphic image components) and passes the video and graphical combination to display processor 70 for display on display unit 75.

Figure 3:
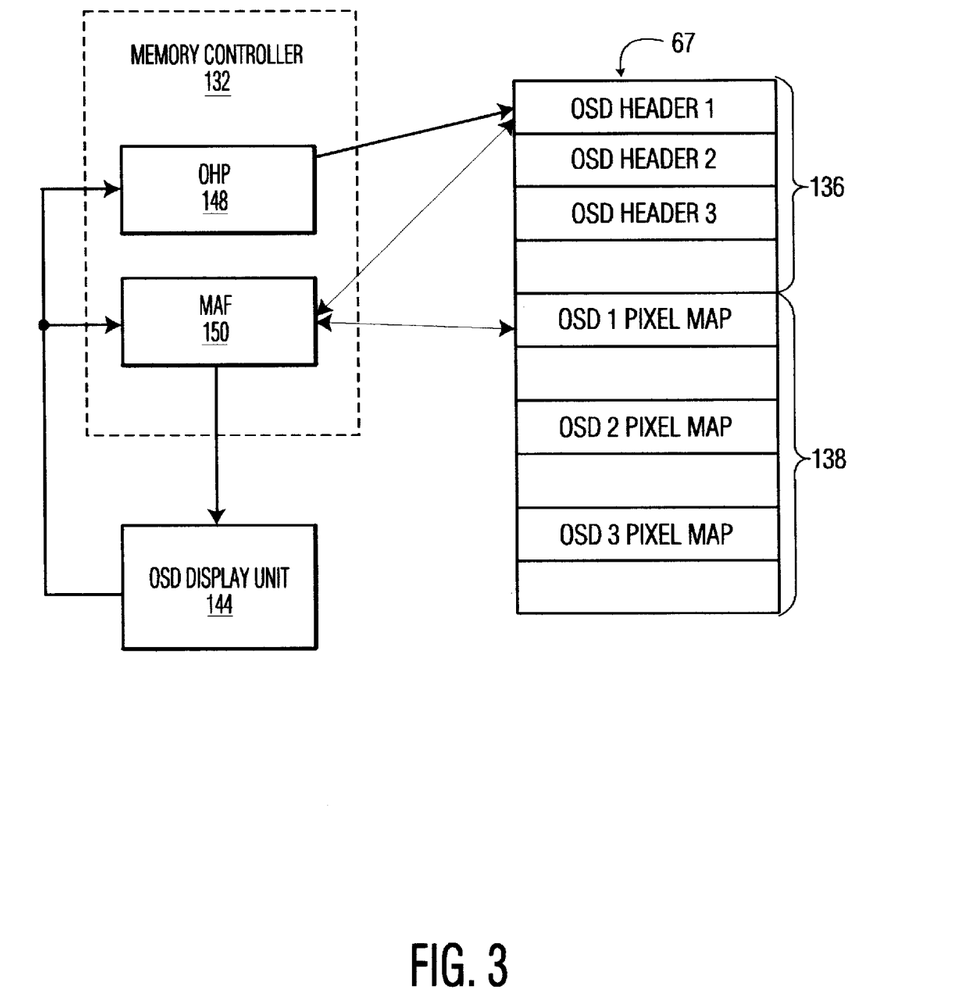
FIG. 3 illustrates a conventional MPEG decoder and video memory arrangement.
Figure 5:
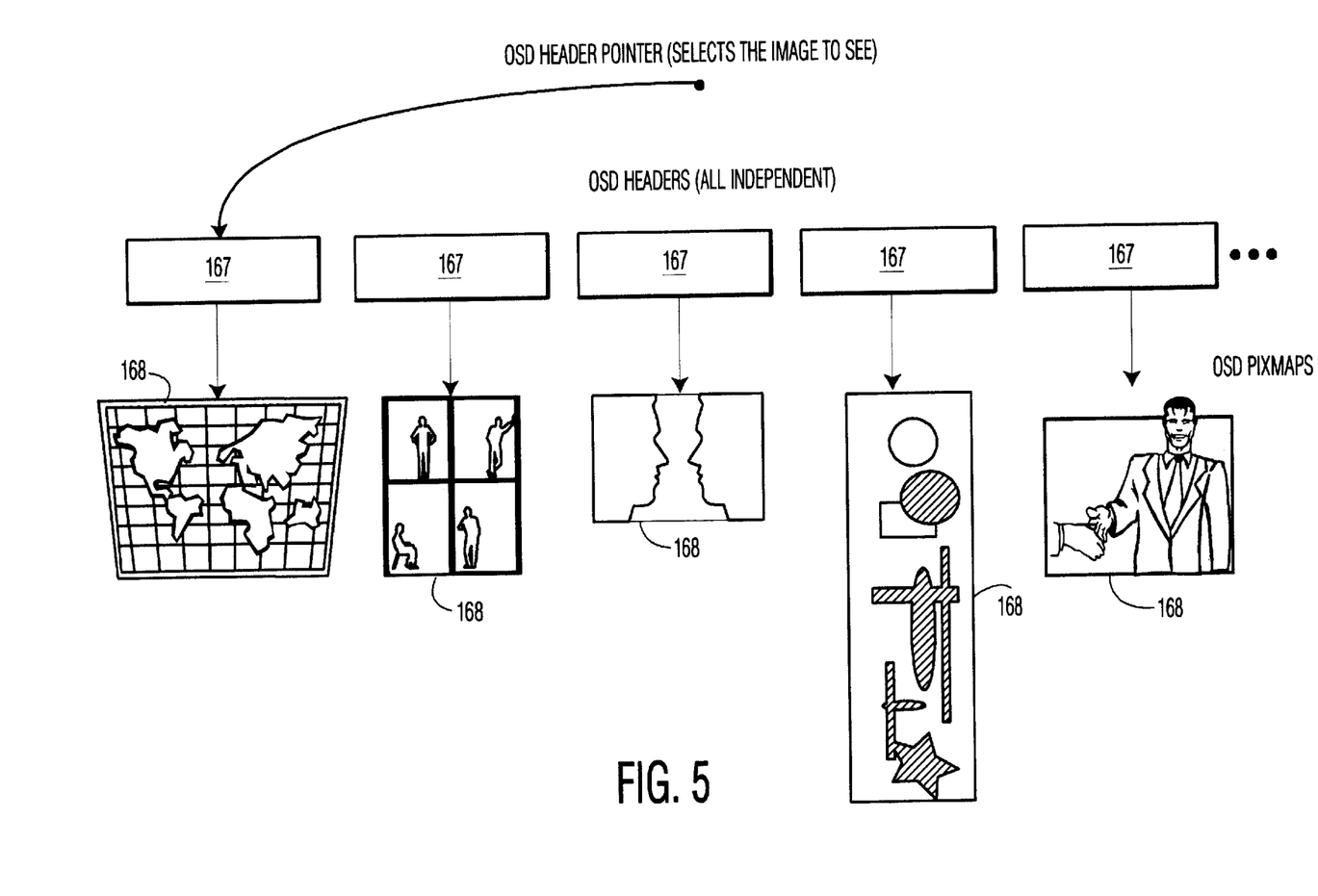
FIG. 5 illustrates conventional OSD data formats.

Referring now to FIG. 3, a conventional OSD management and control arrangement is shown. Memory controller 132 includes, inter alia, an OSD header pointer (OHP) register 148 and a memory access file (MAF) register 150 for facilitating the storage and retrieval of OSD data in OSD header block 136 and OSD pixel map block 138 of memory 67. Memory controller 132 manages the storage and retrieval of OSD data in memory 67 in response to requests from OSD display unit 144. Upon initialization of the video receiver, a plurality of OSD data structures are stored in memory 67. Each OSD data structure includes an OSD header (e.g., "OSD 1", "OSD 2", and "OSD 3" headers) stored in header block 136 of memory 67 and an OSD pixel map (e.g., "OSD 1", "OSD 2", and "OSD 3" pixel maps) stored in pixel map block 138 of memory 67. In accordance with the conventional OSD buffering technique, there is a single OSD header stored in header block 136 for each OSD pixel map stored in pixel map block 138. Each OSD header contains the memory location of the associated pixel map in pixel map block 138 as well as a set of display characteristics that define how the associated pixel map is to be processed by display processor 70 and displayed on display unit 75. For example, the "OSD 1" header contains the memory location of the "OSD 1" pixel map as well as a set of display characteristics defining how the "OSD 1" pixel map is to be processed and displayed. The display characteristics include, but are not limited to, the presence or absence of OSD side panels, the use of pixel compression, the number of bits per pixel, YUV or YIQ colorimetry, degree of transparency, OSD size, OSD format (e.g., interlaced or progressive), OSD color scheme, OSD blending ratio, OSD resolution, aspect ratio, horizontal pixel duplication, vertical pixel duplication, OSD screen location. Some exemplary OSD header and OSD pixel map data structures are illustrated in FIG. 5. As discussed above, each OSD header 167 is associated with a different OSD pixel map 168.

Figure 4:
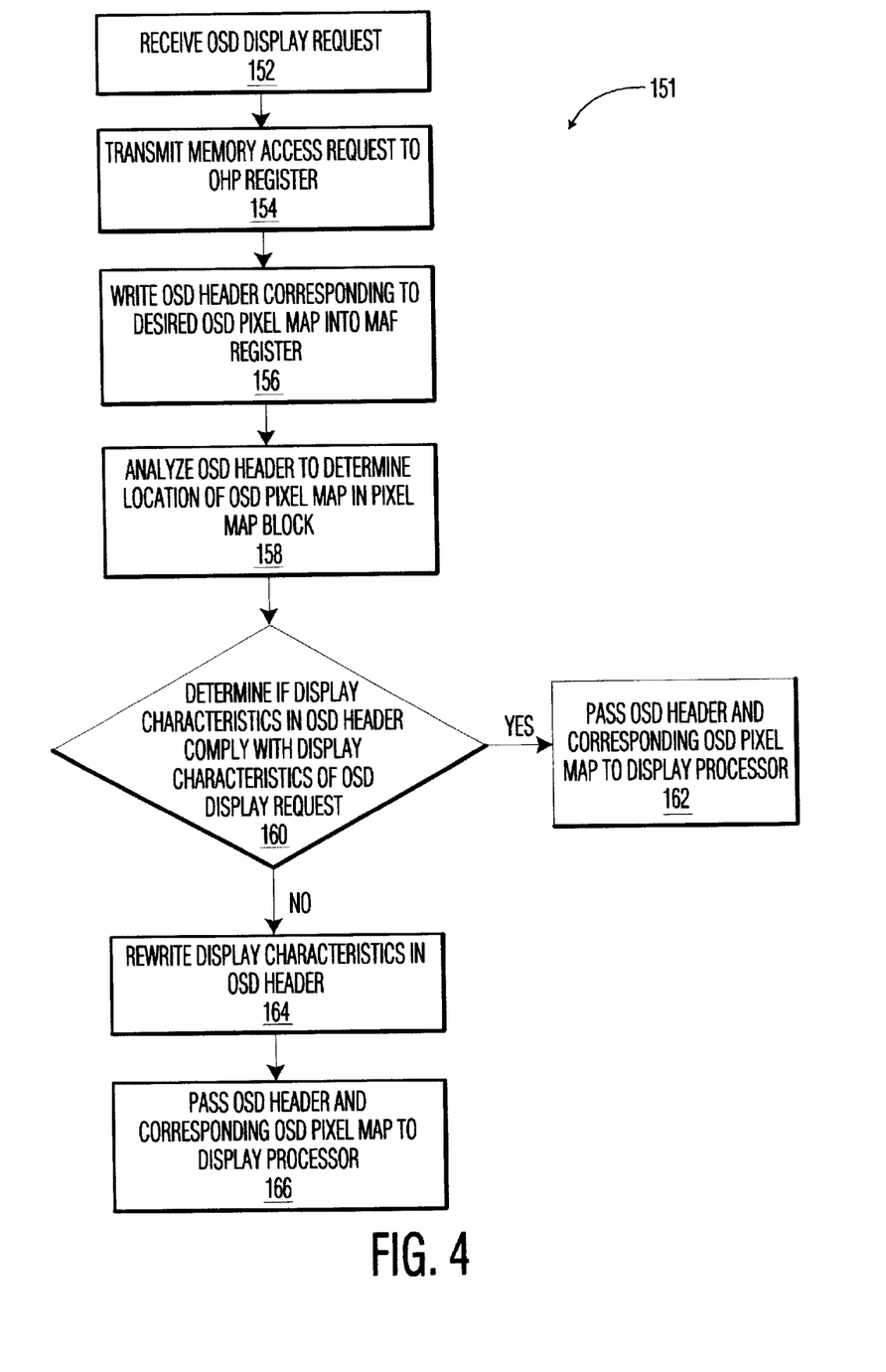
FIG. 4 is a flowchart illustrating a conventional OSD retrieval process.

Referring now to FIG. 4, in conjunction with FIG. 3, a conventional OSD retrieval process 151 is shown. Initially, OSD display unit 144, at step 152, receives an OSD display request from controller 115 to display an OSD (e.g., a graphical image as shown in FIG. 5) on display unit 75. In response to the controller's request, OSD display unit 144, at step 154, transmits a memory access request to OHP register 148. OHP register 148 services the request, at step 156, by writing the OSD header corresponding to the desired OSD pixel map into MAF register 150. OSD display unit 144, at step 158, reads the OSD header to determine the location of the OSD pixel map in pixel map block 138. Once the pixel map location is determined, OSD display unit 144 sets the OSD address in memory controller 132 and requests that memory controller 132 read the image at the set address into MAF register 150. Afterwards, OSD display unit 144, at step 160, determines if the display characteristics in the retrieved OSD header comply with the display characteristics of the OSD display request. For example, the display characteristics of the retrieved header may indicate that the associated pixel map is to be displayed as a blue image in an upper portion of display 75 while the requested display characteristics are for the associated pixel map to be displayed as a green image in a lower portion of display 75. If the display characteristics of the OSD header comply with the requested OSD display characteristics, OSD display unit 144, at step 162, passes the OSD pixel map and the associated display characteristics (as provided in the OSD header) to display processor 70. If the display characteristics of the OSD header do not comply with the requested OSD display characteristics, OSD display unit 144, at step 164, rewrites the display characteristics in the retrieved OSD header and/or redraws the OSD pixel map to contain the requested display characteristics before passing, at step 166, the OSD pixel map (as redrawn) and associated header (as rewritten) to display processor 70, The rewriting of the OSD header and/or redrawing of the OSD pixel map results in a delay between the OSD request from controller 115 and the display of the OSD having the desired display characteristics. In other words, the multiple memory instructions required to modify the OSD header and associated OSD pixel map results in a delay in the display of the OSD. It should be noted that if the OSD display request occurs when the video receiver is involved in a time critical process (e.g., the display of a video program), a delay in the display of the OSD may result in a disruption or distortion of the video (e.g., the introduction of video anomalies) being displayed to a user.

Figure 6:
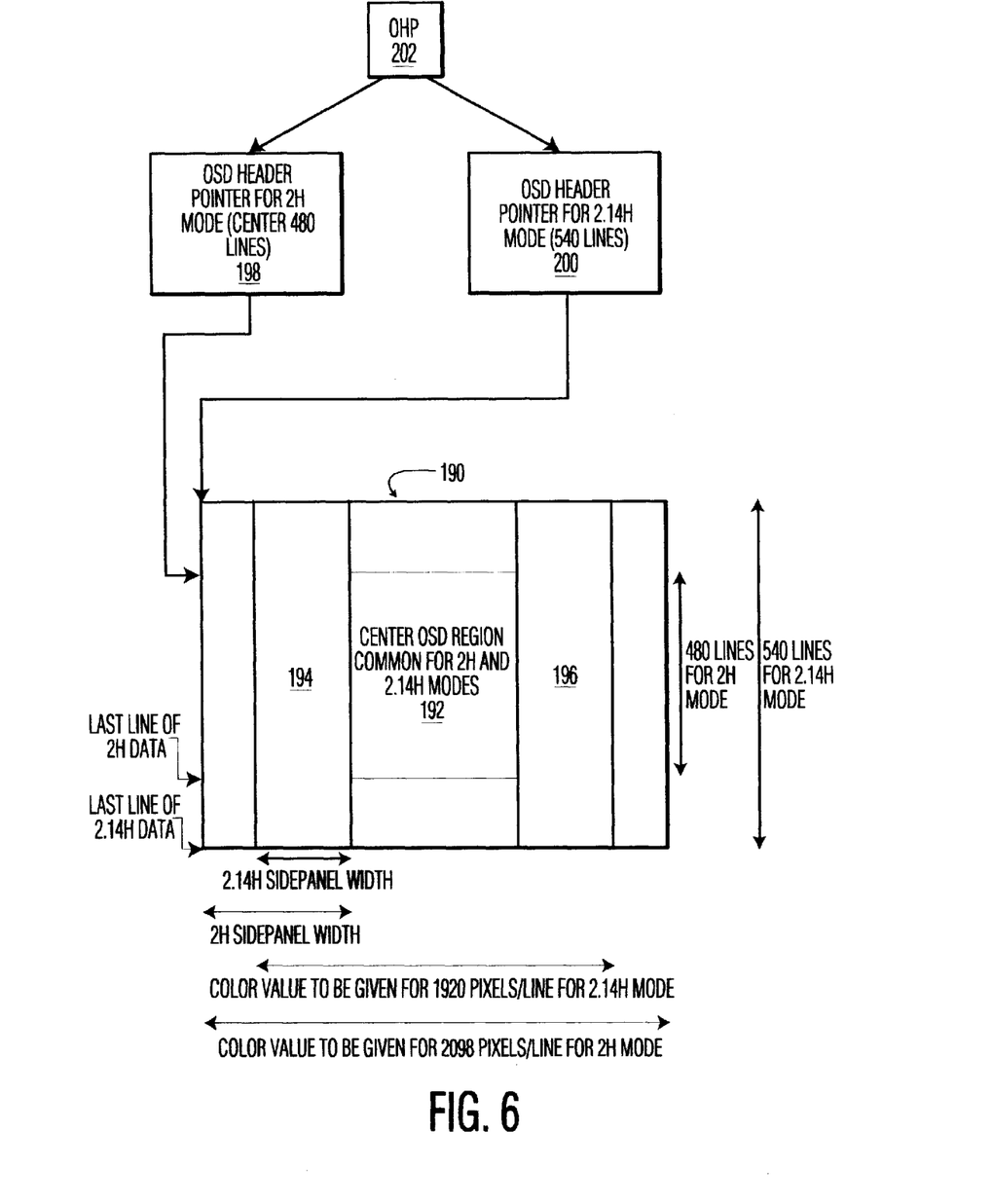
FIG. 6 illustrates an MPEG decoder and video memory arrangement of the present invention.

Referring to FIG. 6, an improved OSD pixmap layout of the present invention is illustrated. In the improved OSD pixmap layout a single OSD pixmap can be displayed over multiple video raster sizes. As shown in FIG. 6, the pixmap layout includes a pixmap 190, a first header 198, a second header 200, and an OHP (OSD header pointer) 202. The pixmap 190 typically comprises a center region 192 where menus, guides and the like are displayed, and left and right side portions that are collectively referred to as sidepanels (194 and 196). The pixels that are selected to be displayed in the sidepanels can be specified as gray, black, or transparent pixels, depending on whether the underlying video image being displayed is in the 4×3 or 16×9 format. The pixels that are not selected to be displayed in the sidepanels can be specified to be either black or transparent pixels. Some other colors may be used for the pixels in the non-displayed portion of the sidepanels as long as these colors do not interfere with the horizontal blanking. As such, pixmap 190 is designed so that the sidepanels of the pixmap can be manipulated to compensate for the size differences between the two displaying modes while allowing the center portion of the OSD image to appear unchanged.

More specifically, a single OSD pixmap 190 is used for both 2H and 2.14H modes. The different portions of the OSD pixmap are selected for displaying based on the displaying mode in which a channel is being watched. Two separate headers 198 and 200 are used to specify display characteristics of the OSD pixmap for the 2H and 2.14H modes. When in the 2.14H mode, header 200 is selected to point to a region having 540 pixel lines with 2096 pixels for each of the 540 pixel lines. When in the 2H mode, header 198 is selected to point to 480 center pixel lines of the pixmap with 2096 pixels for each of the center 480 pixel lines. The sizes of the center regions are identical in both 2H and 2.14 modes.

In the 2.14H mode, since only 1920 pixels per line are to be displayed, it is only necessary to give color values to the center 1920 pixels of the 2096 pixels. The remaining pixels in the non-displayed portion of the sidepanels are forced to either black or transparent so that the visible area on the display screen is a region having 540 lines×1920 pixels per line. Since there are 1920 active pixels per line in the 2.14H mode, the black/transparent pixels outside the center 1920 pixel region overflow into the horizontal blanking. Since these pixels are set to be either black or transparent, they do not interfere with the horizontal blanking. It should be noted that some other colors may be used for the non-selected portions in the sidepanels as long as these colors do not interfere with the horizontal blanking.

Figure 7:
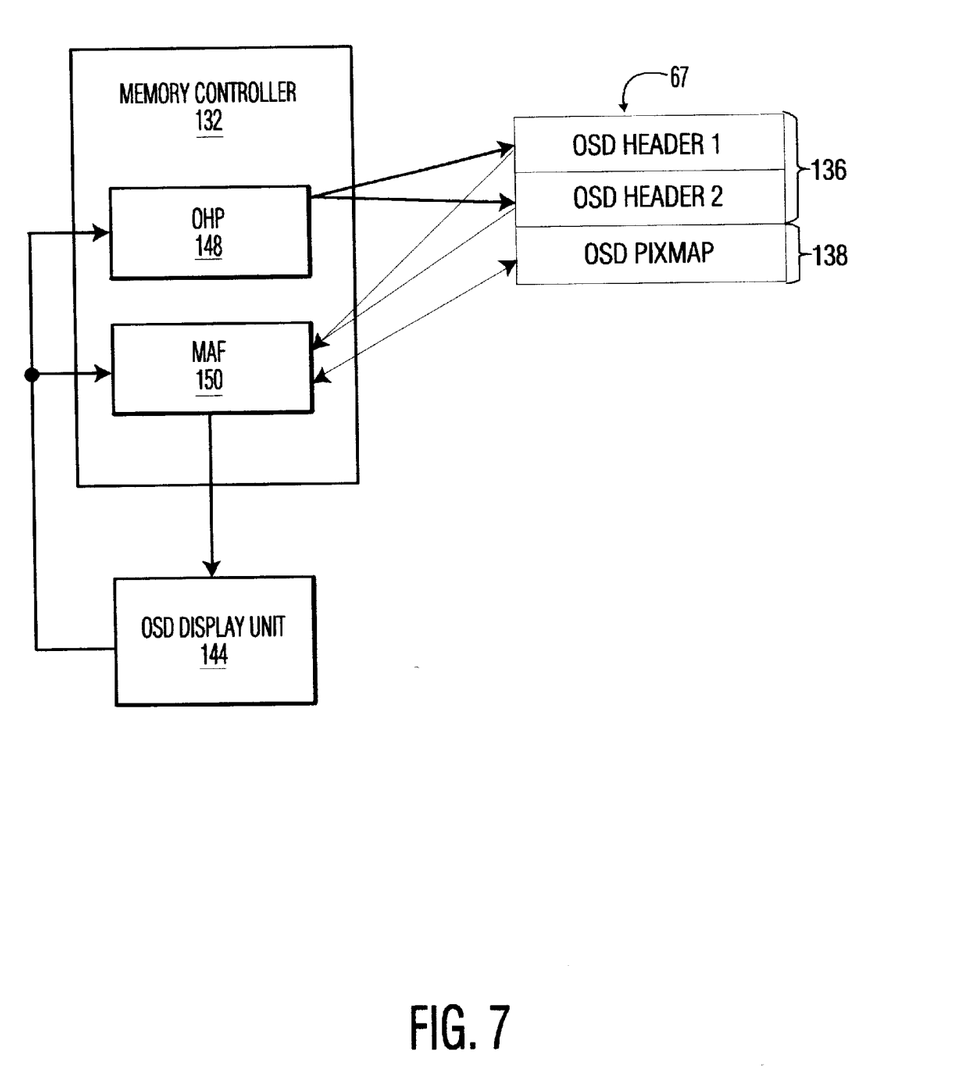
FIG. 7 illustrates an improved OSD arrangement of the present invention.

Referring now to FIG. 7, an improved OSD management and control arrangement of the present invention is illustrated. In accordance with the arrangement of the present invention, an OSD data structure is stored in memory 67 upon initialization of the video receiver. More specifically, the OSD data structure of the present invention includes a single OSD pixmap that is stored in pixel map block 138 of memory 67. As an exemplary implementation, pixmap contains 540 pixel lines with each of the pixel lines having 2096 pixels. The OSD data structure also includes a first header and a second header that are stored in header block 136 of memory 67.

Figure 8:
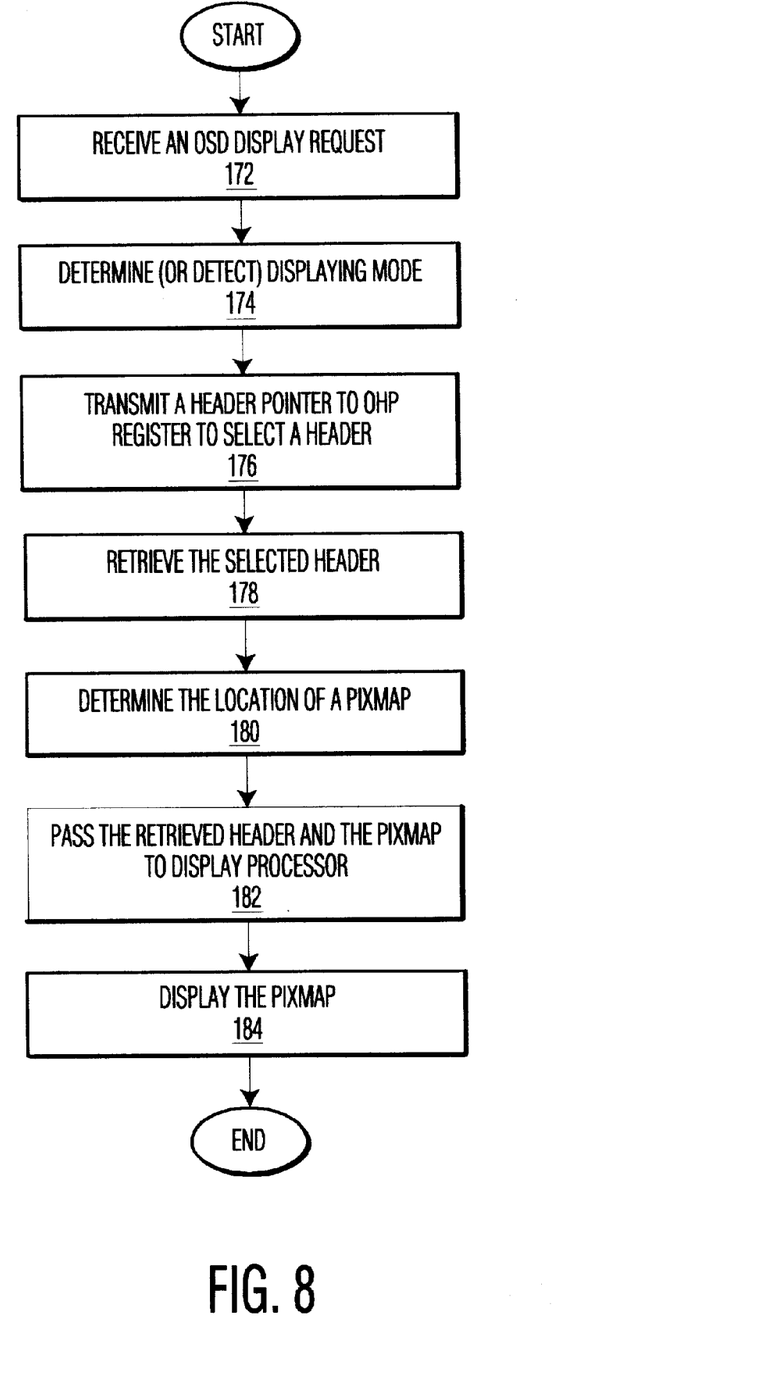
FIG. 8 is a flowchart illustrating the pixmap process of the present invention.

Referring now to FIG. 8, in conjunction with FIG. 7, an exemplary pixmap retrieval process 170 of the present invention is shown.

At step 172, OSD display unit 144 receives an OSD display request from controller 115. The display request contains the information regarding a displaying mode in which the channel is being watched.

At step 174, based on the OSD display request, OSD display unit 144 determines (or detects) the displaying mode in the display request.

At step 176, in response to the display request, OSD display unit 144 transmits a header pointer into OHP register 148 based on the detected displaying mode. Specifically, if the detected displaying mode is 2H mode, the transmitted header pointer will point to first header 198. If the detected displaying mode is 2.14H mode, the transmitted header pointer will point to second header 200.

At step 178, OHP register 148 services the request by retrieving the header and writing the retrieved header into MAF register 150.

At step 180, OSD display unit 144 analyzes the retrieved header to determine the location of the pixmap stored in pixel map block 138.

At step 182, once the pixmap location is determined, OSD display unit 144 passes the retrieved header and pixmap to display processor 70. At this step as shown in FIG. 6, the retrieved header selects either center 480 pixel lines or 540 pixel lines from the pixmap, depending on the displaying mode in which the channel is being watched. It should be noted that the sidepanels at this step are divided into two portions, one being selected for display and the other being non-selected for display on the screen.

At step 184, display processor 70 displays the retrieved pixmap. Specifically, the pixels in the center region of the pixmap are displayed as color pixels, the pixels in the selected portion of the sidepanels are displayed as either gray, black or transparent pixels, and the pixels in the non-displayed portion of the sidepanels are displayed as either black or transparent pixels.

In summary, the present invention can display a single pixmap over multiple video raster sizes. In addition to saving memory space, the present invention also improves displaying speed for a TV system. Thus in a sense, "one size fits all" is an apt description of the pixmap in the present invention. It should be noted that although the present invention has been described with respect to using one pixmap in N (N=2) displaying modes, N could be greater than 2 (N>2). For example, for an arbitrary N, there will be N headers. The present invention can detect which of the N displaying modes is now being displayed, and one of the N headers can select a suitable portion of the pixmap accordingly. Thus, so long as a single pixmap is large enough to encompass the largest raster size of the N displaying modes, the present invention can accommodate any of the N displaying modes with a single pixmap.

While the present invention has been described with reference to the preferred embodiments, it is apparent that that various changes may be made in the embodiments without departing from the spirit and the scope of the invention, as defined by the appended claims.

What is claimed is:

1. A method for displaying a pixmap across at least two raster sizes being a first raster size in a first displaying mode and a second raster size in a second displaying mode, comprising the steps of:
   storing a pixmap having a center region and a sidepanel region;
   storing a first header and a second header;
   detecting whether a displaying mode is in the first displaying mode or the second displaying mode; and
   adjusting the sidepanel portion of the pixmap according to the detected displaying mode by using the first and second headers.

2. The method of claim 1, further comprising the steps of:
   using the first header to adjust the sidepanel portion to fit the first raster size when the detected displaying mode is the first displaying mode; and
   using the second header to adjust the sidepanel portion to fit the second raster size when the detected displaying mode is the second displaying mode.

3. The method of claim 2, further comprising the steps of:
   using the first and second headers to adjust the width of the side panel portion according to the detected displaying mode; and
   using the first and second headers to adjust the height of the pixmap according to the detected displaying mode.

4. The method of claim 2, wherein the pixmap comprises a plurality of pixel lines, further comprising the steps of:
   using the first and second headers to select number of the pixel lines according to the detected displaying mode; and
   using the first and second headers to select the length for each of the selected pixel lines according to the detected displaying mode.

5. The method of claim 2, wherein the pixmap has a center region and a sidepanel region, the sidepanel region is divided into a displayed portion and a non-displayed portion, and wherein the pixels in the center region are displayed in a color that is different from the sidepanel region.

6. The method of claim 5, further comprising the steps of:
   displaying the pixels in the center region as color pixels;
   displaying the pixels in the selected for display portion in the sidepanel region as gray, black or transparent pixels; and
   display the pixels in the non-displayed portion in the sidepanel region as black or transparent pixels.

7. The method of claim 5, wherein the color in non-displayed portion in the sidepanel region does not interfere with the horizontal blanking.

8. The method of claim 1, wherein the first displaying mode is 2H mode and the second displaying mode is 2.14H mode.

9. An apparatus for displaying a pixmap across at least two raster sizes being a first raster size in a first displaying mode and a second raster size in a second displaying mode, comprising:

means for storing a pixmap having a center region and a sidepanel region;

means for storing a first header and a second header;

means for detecting whether the displaying mode is in the first displaying mode or the second displaying mode; and means for adjusting the size of the sidepanel portion of the pixmap according to the detected displaying mode by using the first and second headers.

10. The apparatus of claim 9, further comprising:

means for using the first header to select the sidepanel portion to fit the first raster size when the detected displaying mode is the first displaying mode; and means for using the second header to select the sidepanel portion to fit the second raster size when the detected displaying mode is the second displaying mode.

11. The apparatus of claim 10, further comprising:

means for using the first and second headers to select the width of the sidepanel portion according to the detected displaying mode; and means for using the first and second headers to select the height of the pixmap according to the detected displaying mode.

12. The apparatus of claim 10, wherein the pixmap comprises a plurality of pixel lines, further comprising:

means for using the first and second headers to select number of the pixel lines according to the detected displaying mode; and means for using the first and second headers to select the length for each of the selected pixel lines according to the detected displaying mode.

13. The apparatus of claim 10, wherein the pixmap has a center region and a sidepanel region, and wherein the pixels in the center region are displayed in a color that is different from the pixels in a non-selected portion in the sidepanel region.

14. The apparatus of claim 13, further comprising:

means for displaying the pixels in the center region as color pixels; and means for display the pixels in the non-selected portion in the sidepanel region as black or transparent pixels.

15. The apparatus of claim 13, wherein the color in the non-displayed portion in the sidepanel region does not interfere with the horizontal blanking.

16. The apparatus of claim 9, wherein the first displaying mode is 2H mode and the second displaying mode is 2.14H mode.

* * * * *